United States Patent [19]

Richardson

[11] Patent Number: 5,676,783
[45] Date of Patent: Oct. 14, 1997

[54] WEEPING HOSE

[75] Inventor: Robert L. Richardson, Cookshire, Canada

[73] Assignee: Mercedes Textiles Limited, Canada

[21] Appl. No.: 592,447

[22] Filed: Jan. 26, 1996

Related U.S. Application Data

[62] Division of Ser. No. 181,909, Jan. 18, 1994, Pat. No. 5,500,262.

[30] Foreign Application Priority Data

Jan. 19, 1993 [CA] Canada ............ 2-087-576-3

[51] Int. Cl.$^6$ .......................................... B05B 7/22
[52] U.S. Cl. ............... 156/149; 264/171.12; 264/171.26; 427/235; 427/277
[58] Field of Search ............ 156/149, 148; 264/171.12, 171.26, 209.1; 239/34, 145; 138/126; 427/235, 277

[56] References Cited

U.S. PATENT DOCUMENTS

| | | | |
|---|---|---|---|
| 4,153,080 | 5/1979 | Murray | 239/145 |
| 4,276,908 | 7/1981 | Horne | 156/149 |
| 4,668,318 | 5/1987 | Piccoli | 156/149 |
| 4,668,319 | 5/1987 | Piccoli | 156/149 |
| 4,738,735 | 4/1988 | Joncker | 156/148 |
| 5,047,200 | 9/1991 | Harcourt | 156/149 |

FOREIGN PATENT DOCUMENTS 0973918 11/1964 United Kingdom ............ 239/145

*Primary Examiner*—Daniel Stemmer

[57] ABSTRACT

A method of manufacturing an interior coated weeping hose comprised of warp yarn and filler yarn and having an interior coating, the warp yarn comprising a first warp yarn and a second warp yarn having a larger diameter than the first warp yarn, the first warp yarn comprising the bulk of the warp yarn in the hose, the second warp yarn being disposed axially about the circumference of the hose, comprising the steps of weaving the first warp yarn, the second warp yarn, and the filler yarn together to form a woven hose, applying a coating to the inside wall of the woven hose, pulling said woven hose over a mandrel to remove the coating on the interior surface of the second warp yarn while the remainder of the interior surface remains coated.

4 Claims, No Drawings

WEEPING HOSE

This is a divisional of application Ser. No. 08/181,909 filed on Jan. 18, 1994 now U.S. Pat. No. 5,500,262.

This invention relates to a weeping hose, a hose containing apertures allowing the controlled release of water through fibers from the inside of the hose to the outside of the hose to keep the outside of the hose wet. One use of weeping hoses is as a fire hose where it is desirable to keep the outside of the hose wet to protect the outside of the hose from hot objects such as embers.

There are a number of methods in existence for creating weeping hoses. In one method the hose is perforated along its length to cause a series of apertures in the walls of a hose. One problem with perforation is that the points of the perforator sometimes create a space between warp and filler yarn creating an aperture through which the water will spray out as opposed to weeping out between the fibers of the yarn as desired.

In another method, the exterior of a hose is coated with an elastomer or other coating. A scraper is then pulled along the hose creating lines on the exterior of the hose along which the coating has been removed. The hose is then turned inside out. When water is forced through the hose, water has access to the interior fibers of the hose along the lines scraped in the coating, the water weeps through the interior fibers to wet the outside of the hose.

One of the problems with the prior art was that in the perforation process holes were occasionally created between fibers in the wall of the hose which allows water to shoot through the openings in the wall of the hose rather than weep through the fibers in the wall of the hose. The problem with the scraping of the elastomer or other coating on the exterior of the hose is that the hose must subsequently be turned inside out so that the elastomer is on the inside of the hose.

In U.S. Pat. No. 4,738,735 there is disclosed a method of extruding elastomeric material on the inside of a hose inside a loom. Following the extrusion of elastomeric material on the inside of the hose, the hose and elastomeric material are pulled through a mandrel which presses the elastomeric material against the inside of the hose.

The problems of the prior art in creating access through the elastomer to the fibers on the inside of the hose so that the water may weep through the fibers while avoiding puncturing of the walls with sharp objects or turning the hose inside out were overcome by utilizing a first warp yarn and a second warp yarn, in the first warp yarn and the second warp yarn having different diameters. The circumference of the second warp yarn extends a greater distance towards the center of the fire hose than the circumference of the first warp yarn used in the remainder of the hose.

When utilizing the process of applying elastomeric material to the inside wall of the fire hose inside the loom as taught in U.S. Pat. No. 4,738,735, the elastomeric material is still hot when it passes through the mandrel.

The elastomeric material on the interior surface of the second warp yarn is removed by the mandrel while the interior surface of the first warp yarn remains covered by elastomeric material after passing through the mandrel.

In manufacturing lined weeping hose according to this invention, hose was manufactured on a loom having 216 ends. The warp was composed of 210 smaller diameter 1000 denier 2 ply polyester filament first warp yarn and six 4.5×4 ply staple second warp yarn displaced at 60° relative to one another about the circumference of the hose. The 1½ inch, 38 millimeter diameter hose had 454 picks per meter.

Immediately after the hose had been woven, elastomeric material was applied to the inside wall of the hose as taught in U.S. Pat. No. 4,738,735. The hose with hot elastomer was drawn over a mandrel to force the elastomer against the inside wall of the hose. The areas of the inside of the hose where the second warp yarn passed over the mandrel were left clear of elastomer whereas the remainder of the interior wall of the hose comprised of the first warp yarn was coated with elastomer. Upon completion of manufacture water under pressure was passed through the hose and water wept through the fibers at the second warp yarn from the interior of the hose.

The diameter of the second warp yarn relative to the first warp yarn need only be sufficient that the mandrel remove the elastomer or other material coating from the second warp yarn on the interior of the hose at those positions where the second warp yarn passes over the filler yarn. While the description herein has been with reference to elastomer coatings it will be recognized by those skilled in the art that the invention can be used with other coatings provided such coatings are capable of flowing at the time that the hose and coating are passed through the mandrel.

A method of manufacture of interior coated weeping hose comprised of warp yarn, filler yarn and having an interior coating, the warp yarn comprising a first warp yarn and a second warp yarn having different diameters, the first warp yarn comprising the bulk of warp yarn in the hose, the second warp yarn is disposed axially about the circumference of the hose, comprising the steps of weaving the first warp yarn and the second warp yarn and the filler yarn together, pulling said woven hose over a mandrel to remove the coating on the interior surface of the second warp yarn while the remainder of the interior surface remains coated.

I claim:

1. A method of manufacturing an interior coated weeping hose comprised of warp yarn and filler yarn and having an interior coating, the warp yarn comprising a first warp yarn and a second warp yarn having different diameters, the second warp yarn having a larger diameter than the first warp yarn, the first warp yarn comprising the bulk of warp yarn in the hose, the second warp yarn being disposed axially about the circumference of the hose, comprising the steps of weaving the first warp yarn and the second warp yarn and the filler yarn together to form a woven hose, applying a coating material to the inside wall of the woven hose, and pulling said woven hose over a mandrel to remove the coating on the interior surface of the second warp yarn while the remainder of the interior surface remains coated.

2. The method of manufacture of claim 1 in which the first warp yarn is comprised of 1000 denier 2 ply polyester filament yarn and the second warp yarn is comprised of 4.5×4 ply staple yarn.

3. The method of manufacture of claim 2 in which second warp yarns are six in number displaced at 60° relative to one another about the circumference of the hose.

4. The method of manufacture of claim 3 in which the coating material is an elastomer.

* * * * *